April 6, 1937.  G. F. RACKETT  2,075,909
SHUTTER DRIVE
Filed July 26, 1934  2 Sheets-Sheet 1

April 6, 1937.  G. F. RACKETT  2,075,909
SHUTTER DRIVE
Filed July 26, 1934  2 Sheets-Sheet 2

Inventor
Gerald F. Rackett
By Roberts, Cushman & Woodbury
his Attys.

Patented Apr. 6, 1937

2,075,909

UNITED STATES PATENT OFFICE 2,075,909

SHUTTER DRIVE

Gerald F. Rackett, Los Angeles, Calif., assignor to Technicolor Motion Picture Corporation, Hollywood, Calif., a corporation of Maine Application July 26, 1934, Serial No. 737,032

5 Claims. (Cl. 88—17)

The present invention relates to a drive arrangement which, although applicable to other uses, is especially suited for motion picture cameras and similar photographic devices.

In certain photographic apparatus, as for example in the camera described in copending application Serial No. 558,193, filed August 20, 1931, the objective is supported in a closure hinged to the camera housing. Associated with the objective are control devices as for example a rotating shutter, which are driven in synchronism with other movements of the camera, from a power source on the camera housing.

The main objects of the present invention are to provide an improved arrangement of the control device, for example a shutter, and to provide a simple and yet reliable connection between power supply and control device.

In one aspect, the invention contemplates the mounting of the control device on the hinged closure which also supports the lens system, thereby providing a compact construction and improved coordination of these cooperating elements of construction.

In another aspect, the invention provides a simplified and inherently accurate and reliable power transmission between the power source, fastened to the apparatus housing, and the control device on the lens support which is hinged to the housing, by leading the transmission coaxially with the hinge so that driving and driven elements may remain connected regardless of the relative position of housing and lens support.

These and other objects, features and embodiments of the invention will be apparent from the following explanation of its genus with reference to a concrete embodiment thereof.

The description refers to drawings in which.

Figure 1:
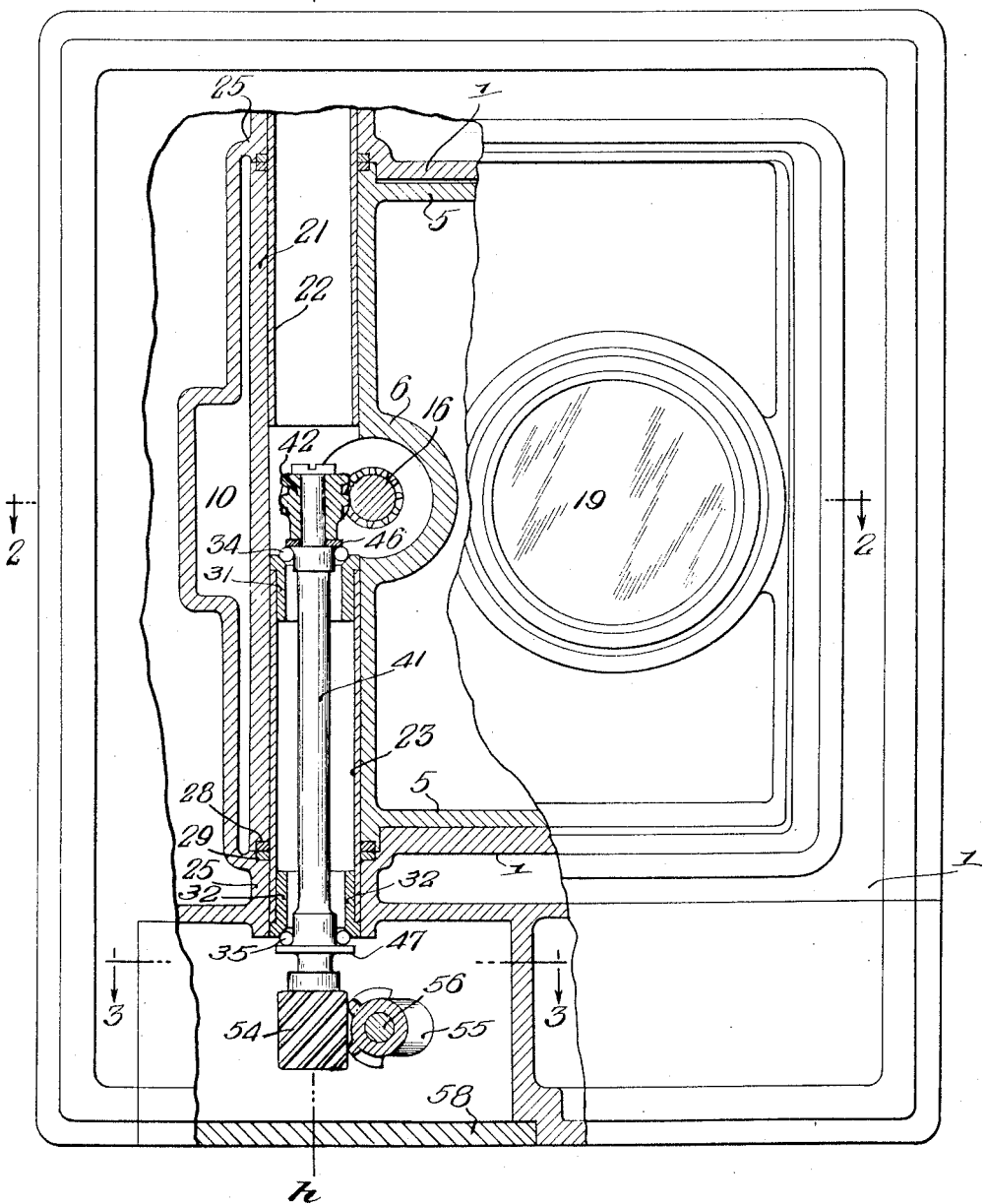
Fig. 1 is a front elevation of a motion picture camera, with part of the housing and lens support structure broken away to show the drive according to the present invention.
Figure 2:
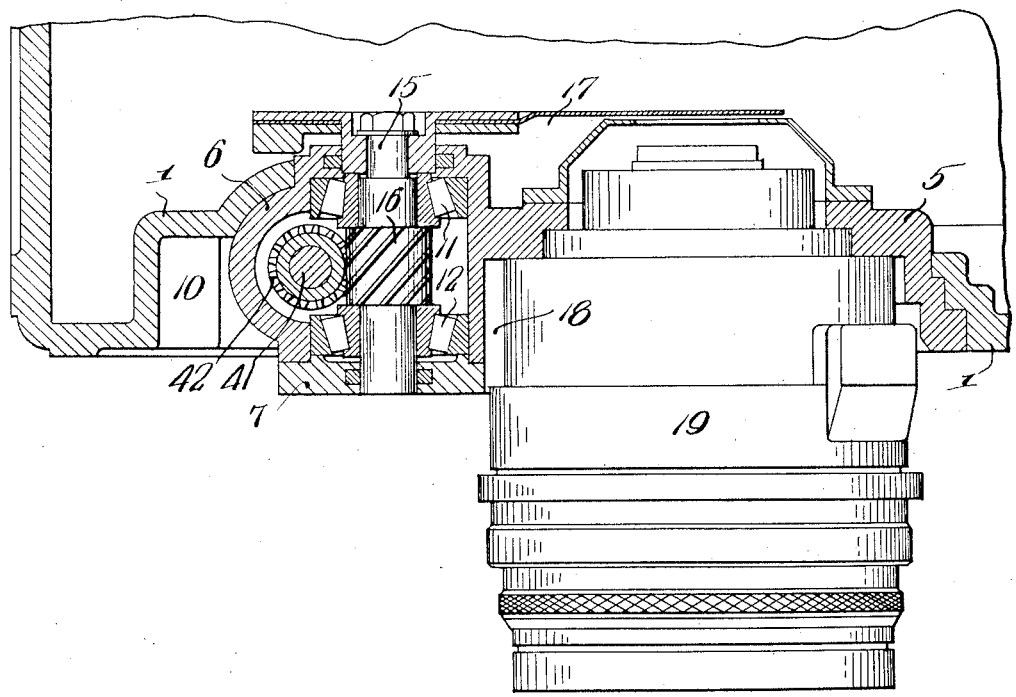
Fig. 2 is a horizontal section on line 2—2 of Fig. 1.
Figure 3:
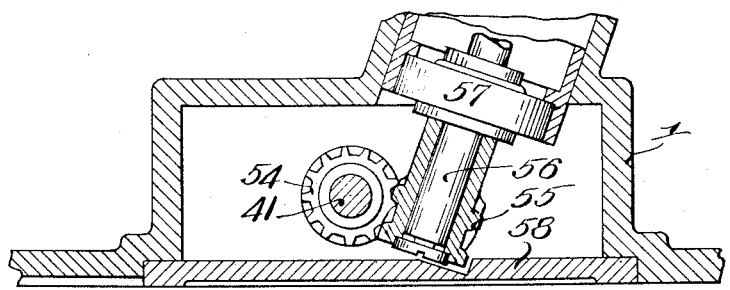
Fig. 3 is a horizontal section on line 3—3 of Fig. 1.

Referring to the drawings, I denotes the walls of a camera housing. A door 5 preferably like the housing, a light metal casting, has a clutch journal boss 6 and a journal plate 7 supporting two tapered roller bearings 11 and 12 for shutter shaft 15 to which a helical gear wheel 16 and the shutter proper 17 are fastened. The camera housing has a recess or pocket 10 which receives the shutter support portion of the door in open position. A central opening 18 permits entrance of the light through lens system 19, which is not part of the present invention and therefore not further described. The shutter shaft housing extends upwardly and downwardly, forming hinge portions 21 with pressed in or otherwise fastened tubes 22, 23, which extend into essentially tubular hinge receptacles 25 of the housing which form journals for tubes 22, 23, permitting rotation of the door about hinge axis $h$—$h$. Thrust bearing rings 28, 29 support the door in vertical direction.

Fastened to tube 23 are two sleeves 31 and 32 which form beveled seats for ball bearings 34 and 35 supporting shaft 41 on collars 46 and 47. This shaft is mounted coaxially with the hinge, that is, its axis of rotation coincides with hinge axis $h$—$h$. To the upper end of shaft 41 is screwed a helical gear wheel 42 drivingly engaging the above-described gear wheel 16 of the shutter shaft.

Secured to the lower end of shaft 41 is a gear wheel 54 engaging worm 55 on driving shaft 56 which is suitably supported on the housing, for example by means of bearing 57. This part of the drive is easily accessible through a cover 58.

It will now be evident that the shutter drive and the lens are always in the same relative position, and that the driving connection from worm 55 through shaft 41 to shutter 17 remains established regardless of the relative position of apparatus housing 1 and door 5.

It should be understood that the present disclosure is for the purpose of illustration only and that this invention includes all modifications and equivalents which fall within the scope of the appended claims.

I claim:

1. Optical apparatus of the character described comprising an apparatus housing, a door connected to said housing by a hinge having a hollow pintle portion extending along one side of said door, a lens system and a light control movement mounted on said door, a drive for said movement mounted on said housing, and a power transmitting connection between said movement and said drive including a shaft within said hollow portion.

2. Optical apparatus of the character described comprising an apparatus housing, a support member movably fastened to said housing for rotation about an axis, an optical system and a light control means mounted on said member, and a driving link between said housing and said control means for transmitting to said control means rotatory motion substantially in the direction of said axis.

3. Optical apparatus of the character described comprising an apparatus housing, a support member connected to said housing by a hinge structure, an optical system and a control device for said system mounted on said member, a power supply on said housing, and a link transmitting power substantially in the direction of the axis of said hinge structure and drivingly connecting said supply and said control device.

4. Optical apparatus of the character described comprising an apparatus housing, a door connected to said housing with a hinge structure having a hollow pintle portion, a lens system and a shutter therefor mounted on said door, a power supply shaft journaled on said housing, a shaft within said hollow portion, and gears on either end of said shaft for transmitting power therethrough from said supply to said shutter.

5. Cinematographic apparatus of the character described comprising a camera housing having a door pivoted to the housing, a lens system and a shutter mounted on said door, a driving shaft in said housing, and a flexible connection in the pivotal axis of the door connecting said driving shaft and said door for transmitting power to said shutter.

GERALD F. RACKETT.